United States Patent [19]

McMorrow, Jr.

[11] Patent Number: 5,578,949
[45] Date of Patent: Nov. 26, 1996

[54] SINGLE STAGE VOLTAGE TO CURRENT CONVERSION SWITCHING SYSTEM

[75] Inventor: Richard H. McMorrow, Jr., Lincoln, Mass.

[73] Assignee: Analogic Corporation, Peabody, Mass.

[21] Appl. No.: 391,404

[22] Filed: Feb. 16, 1995

[51] Int. Cl.$^6$ .................................................. H02M 11/00
[52] U.S. Cl. .......................... 327/103; 327/307; 327/513; 327/561
[58] Field of Search ..................................... 327/103, 530, 327/538, 512, 513, 307; 330/252, 254, 256, 259, 261, 278, 289

[56] References Cited

U.S. PATENT DOCUMENTS

| | | | |
|---|---|---|---|
| 4,274,016 | 6/1981 | Ghahramani | 327/103 |
| 4,544,875 | 10/1985 | Park et al. | 323/280 |
| 5,231,315 | 7/1993 | Thelen, Jr. | 327/103 |
| 5,231,316 | 7/1993 | Thelen, Jr. | 327/103 |
| 5,302,919 | 4/1994 | Abe | 331/2 |
| 5,359,298 | 10/1994 | Abe | 331/2 |
| 5,394,025 | 2/1995 | Pierson | 327/103 |

OTHER PUBLICATIONS

Shin, "Designer's Casebook" *Electronics*, vol. 52, No. 10, May 10, 1979.

*Primary Examiner*—Timothy P. Callahan
*Assistant Examiner*—Kenneth B. Wells
*Attorney, Agent, or Firm*—Iandiorio & Teska

[57] ABSTRACT

A single stage voltage to current conversion switching system which includes an input terminal for receiving an input signal voltage to be converted to a current, an output terminal, and a positive channel having a first operational amplifier with a reference input and a summing input. The summing input receives the input voltage signal and introduces a first offset voltage to the input signal voltage. There is a first semiconductor circuit connected to the output of the first operational amplifier to provide a first offset current signal. There are first switching means interconnected with the first semiconductor circuit to deliver the first offset current signal to the output terminal. There is a negative channel having a second operational amplifier with a reference and a summing input that receives the input voltage signal and introduces a second offset signal to the input signal voltage. There is a second semiconductor circuit connected to the output of the second operational amplifier to provide a second offset current signal equal in amplitude and opposite in polarity to the first offset current signal. There are second switching means interconnected with the second semiconductor circuit to deliver the second offset current signal to the output terminal and means for actuating the first and second switching means simultaneously to open and close and periodically combine the first and second offset current signals to form an output current with temperature drift and switching current injection compensation.

4 Claims, 5 Drawing Sheets

SINGLE STAGE VOLTAGE TO CURRENT CONVERSION SWITCHING SYSTEM

FIELD OF INVENTION

This invention relates to a voltage to current conversion switching system, and more particularly to such a system which uses complementary channels to offset drift and switching current effects and charge injection and further to such a system which adjusts the current output to maintain a constant output charge independent of switching period durations.

BACKGROUND OF INVENTION

In high speed applications such as analog to digital conversion in image processing systems, it is often necessary to produce a current from a voltage such that the current is precisely proportional to the voltage despite drift due to time and temperature and distortion due to switching currents interfering with the switched current. These problems are especially serious when the switching times are in the picosecond range to provide integration conversions in the nanosecond range.

A further problem occurs when the integration window must be capable of being varied over a wide range, for example from 6 to 48 nanoseconds: at shorter durations, less charge is accumulated and so a lower voltage is applied to the A/D converter so that the whole input range of the A/D converter is not fully utilized.

To overcome the above described problems the present inventor developed a voltage to current conversion switching system which is described in U.S. Pat. No. 5,041,794 (the '794 patent). That patent is incorporated herein in its entirety by reference. In that patent the high speed switching in the voltage to current conversion system necessary in video applications is accomplished by high speed transistors. However, by implementing the high speed switching in this manner the system's gain stability over its operating temperature range is severely affected. To improve the gain stability, operational amplifiers are used in place of the discrete transistors as is shown in FIG. 5 of that patent. However, this embodiment is useful only at lower speeds in the 50 nanosecond range and is not useful for video applications. Moreover, in that embodiment two pairs of operational amplifiers (two stages) must be used; a first pair of operational amplifiers, one in each channel, are used to offset the input voltage signal and a second pair of operational amplifiers, one in each channel, are used in conjunction with transistors to accomplish the voltage to current conversion.

SUMMARY OF INVENTION

It is therefore an object of this invention to provide an improved voltage to current conversion switching system.

It is a further object of this invention to provide such a voltage to current conversion switching system which accomplishes the functions of voltage to current conversion, voltage gain, and offset in a single stage.

It is a further object of this invention to provide such a voltage to current conversion switching system which utilizes fewer components.

It is a further object of this invention to provide such a voltage to current switching system which utilizes high speed operational amplifiers.

It is a further object of this invention to provide such a voltage to current conversion switching system with improved gain stability over a wide range of operating temperatures.

It is a further object of this invention to provide such a voltage to current conversion switching system capable of high speed switching in the picosecond range.

It is a further object of this invention to provide such a voltage to current conversion switching system which is precise and reliable even at high speeds.

It is a further object of this invention to provide such a voltage to current conversion switching system which virtually eliminates time and temperature drift effects.

It is a further object of this invention to provide such a voltage to current conversion switching system which virtually eliminates switching charge injection effects.

It is a further object of this invention to provide such a voltage to current conversion switching system that maintains the same dynamic range of charge (current/time) output over a wide range of charging times.

The invention results from the realization that a truly effective high speed, reliable and accurate voltage to current switching system with improved gain stability and fewer components can be achieved by submitting the input voltage signal to two matched channels both of which provide voltage gain and voltage offset as well as voltage to current conversion in a single stage; one channel adds a positive offset and the other adds a negative offset, and after converting the offset voltages to currents they are recombined to achieve the resultant current to cancel any temperature drift and switching current injection effects, and from the further realization that the charge output of the system can be held constant independent of the switching period by adjusting the gain as a function of switching period so that the total charge is always held constant.

This invention features a voltage to current conversion switching system including an input terminal for receiving an input signal voltage to be converted to a current and an output terminal. There is a positive channel having a first operational amplifier with a reference input and a summing input for receiving and introducing a first offset to the input signal voltage, a semiconductor circuit connected with the output of the first operational amplifier to provide a first offset current signal, and first switching means responsive to the first operational amplifier to deliver the first offset current signal to the output terminal. There is also a negative channel having a second operational amplifier with a reference input and a summing input for receiving and introducing a second offset to the input signal voltage, and a semiconductor circuit connected with the output of the second operational amplifier to provide a second equal and opposite offset current signal to compensate for the temperature drift and switching current injection in the first and second offset current signals. There are second switching means responsive to the second operational amplifier to deliver the second offset current signal to the output terminal. There are means for actuating the first and second switching means simultaneously to open and close and periodically combine the first and second offset current signals to produce an output current compensated for temperature drift and switching current injection.

In a preferred embodiment the system includes first and second shunt switching means connected in series between the first and second operational amplifiers for shunting the first and second offset current signals when the first and second switching means are switched off to maintain current flow in the system even when no current is provided to the output terminal. Each of the channels includes gain adjusting means, responsive to the means for actuating, to adjust the gain to maintain at a predetermined level the charge provided by the output current.

The invention also features a voltage to charge conversion switching system including an input terminal for receiving an input signal voltage to be converted to a current and an output terminal. There is a positive channel having a first operational amplifier with a reference input and a summing input for receiving and introducing a first offset to the input signal voltage, a semiconductor circuit connected with the output of the first operational amplifier to provide a first offset current signal, and first switching means responsive to the first operational amplifier to deliver the first offset current signal to the output terminal. There is also a negative channel having a second operational amplifier with a reference input and a summing input for receiving and introducing a second offset to the input signal voltage, and a semiconductor circuit connected with the output of the second operational amplifier to provide a second equal and opposite offset current signal to compensate for temperature drift and switching current injection in the first and second offset current signals. There are second switching means responsive to the second operational amplifier to deliver the second offset current signal to the output terminal. Finally, there are included means for actuating the first and second switching means to simultaneously periodically combine the first and second offset current signals to produce an output charge compensated for temperature drift and switching current injection and to maintain the output charge at a predetermined level independent of the timing of the actuation of the switching means.

DISCLOSURE OF PREFERRED EMBODIMENT

Other objects, features and advantages will occur to those skilled in the art from the following description of a preferred embodiment and the accompanying drawings, in which.

Figure 1:
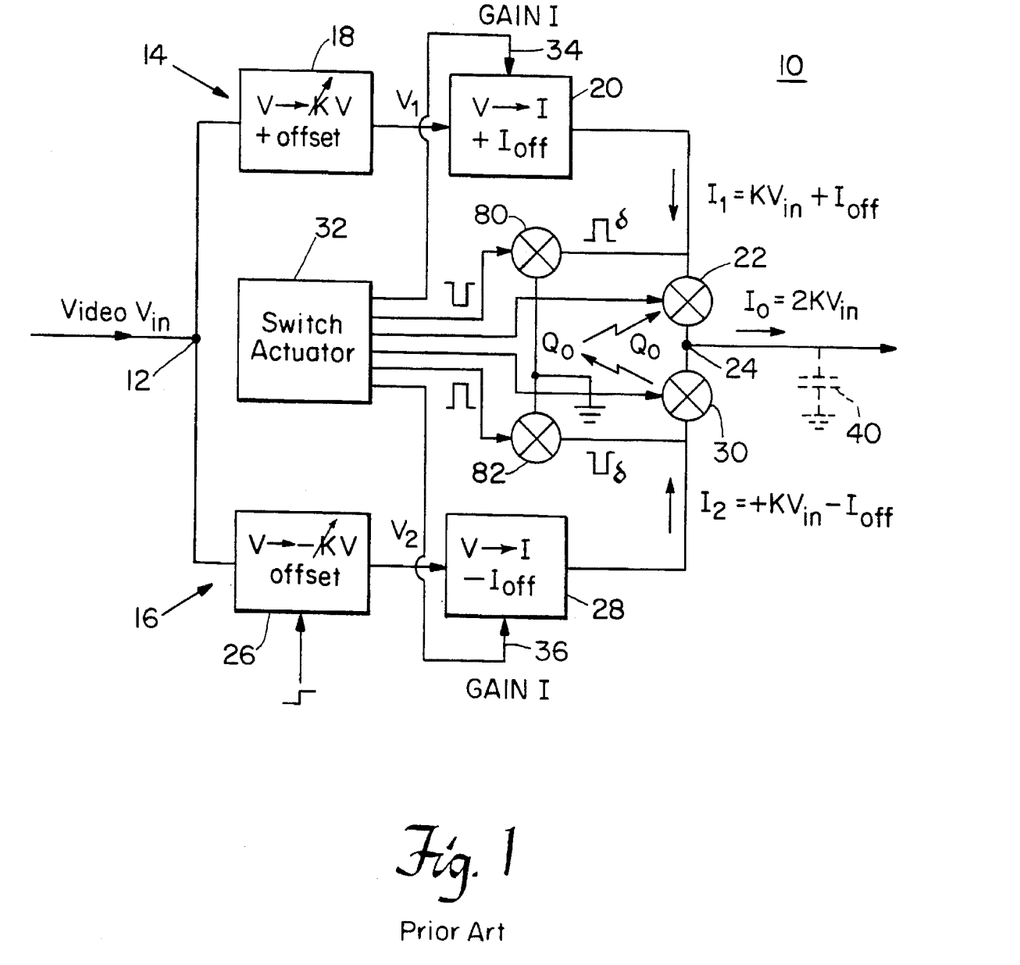
FIG. 1 is a block diagram of a prior art voltage to current conversion switching system described in U.S. Pat. No. 5,041,794.

There is shown in FIG. 1 a prior art voltage to current conversion switching system 10 as described in the '794 patent which includes an input terminal 12 for receiving an input signal voltage such as a video signal $V_{in}$. $V_{in}$ is directed then to two channels, a first or positive channel 14, and a second or negative channel 16. Positive channel 14 includes an offset amplifier 18 which introduces a fixed positive offset, for example two volts in the instance where $V_{in}$ is an approximately 1 volt video signal. From offset amplifier 18 the offset voltage $V_1$ is delivered to a voltage to current amplifier 20. The output of amplifier 20, current $I_1$, is proportional to Vin and the current offset. This is delivered to switch 22, which may be implemented for example by a high-speed switching transistor. The output of switch 22 is delivered to output terminal 24.

The second, negative channel 16 includes a second offset amplifier 26 which provides a negative two volt offset to the incoming positive voltage Vin, resulting in a voltage $V_2$. This voltage is delivered to voltage to current amplifier 28, which in turn delivers to switch 30 a second current $I_2$, which is proportional to $V_{in}$. Switch 30 can also be implemented by a high-speed transistor. Switches 22 and 30 are operated by switch actuator 32, which may be driven from control logic to control an A/D converter which is fed from output 24, or any other suitable timing means which achieves the desired switching cycles.

The use of two matched complementary channels 14 and 16 accomplishes a number of beneficial results for system 10. First, any temperature drift which occurs in one channel can be offset by an equal and opposite change in the other channel, thereby compensating for the temperature effects. In addition, any switching currents which are injected into $I_1$ and $I_2$ by switches 22 and 30 will be equal and opposite, thereby offsetting those switching currents. Thus, two of the primary problems with high-speed switching circuits are addressed by the configuration of system 10. This approach of course assumes that amplifiers 18 and 26, and 20 and 28, and switches 22 and 30, in each channel are matched components or have matched characteristics. System 10 has an added feature: it is capable of maintaining a constant charge at output terminal 24, regardless of the length of the switching cycle imposed by switch actuator 32 on switches 22 and 30. It accomplishes this by varying the gain over lines 34 and 36 in amplifiers 20 and 28 so that as the switching time increases the gain decreases, and conversely as the switching time decreases the gain increases, so that the amount of charge which appears at output terminal 24 for a given period of time, for example to charge a capacitor 40, is always the same. Thus a capacitor such as 40 would always reach the same voltage regardless of the switching period.

Figure 2:
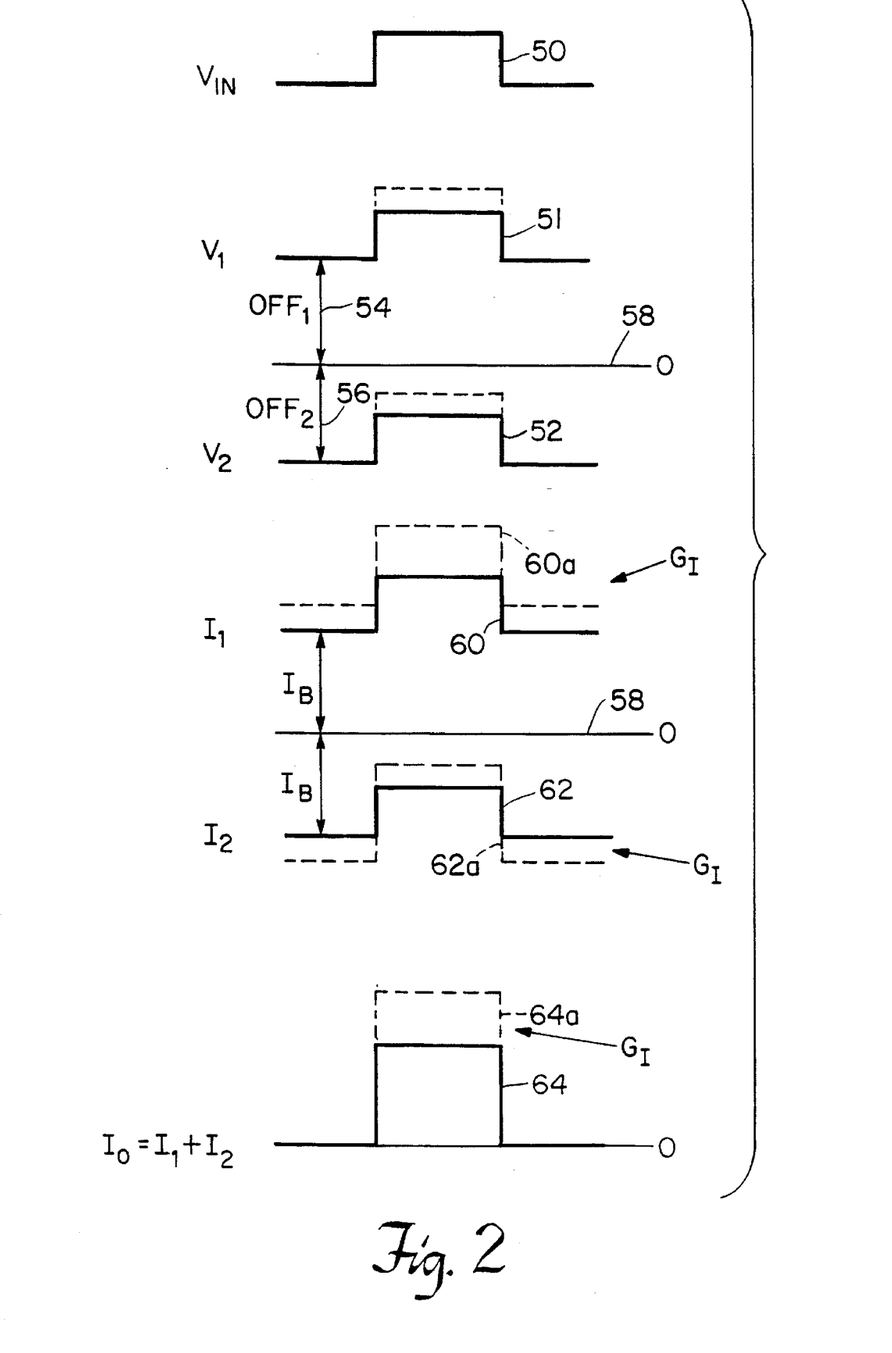
FIG. 2 is an illustration of a number of the waveforms which occur in the device of FIG. 1 and in the device of the present invention.

This may be better understood with reference to FIG. 2, where it can be seen that $V_1$ 51 and $V_2$ 52 have the same period as $V_{IN}$ 50, but they have been offset by the amounts 54, 56 from ground or common 58. Offset currents $I_1$ 60, and $I_2$ 62, are shifted above and below ground 58 in equal amounts in the same manner as $V_1$ and $V_2$. In addition, any variation in gain over lines 34 and 36 causes the offset currents $I_1$ and $I_2$ to be shifted as indicated in phantom at 60a and 62a as a result of the adjustment in the gain $G_1$. When the currents $I_1$ and $I_2$ are combined at terminal 24 by the operation of switches 22 and 30, the resulting current $I_o$ 64 is a combination of both currents $I_1$ and $I_2$ plus the modification made by the gain 64a.

Figure 3A:
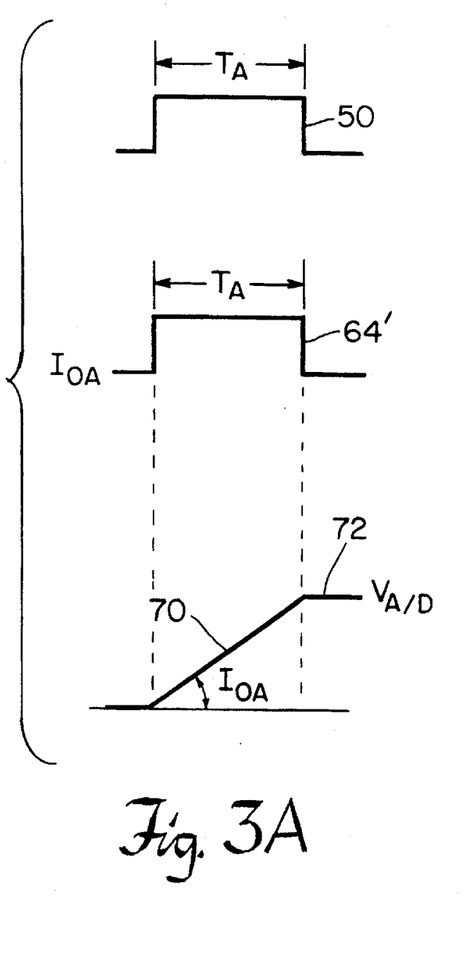
FIG. 3 is a depiction of two sets of waveforms which illustrate the constant charge output achievable according to the device of FIG. 1 and according to one aspect of this invention.
Figure 3B:
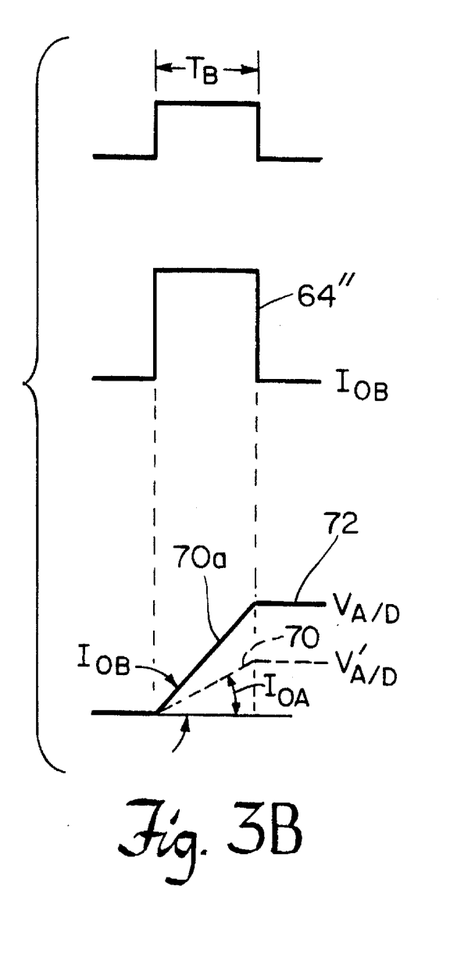

The effect of the gain in keeping the output charge constant can be better understood with reference to FIG. 3, where in a first case the $V_{IN}$ 50 has a duration $T_A$ resulting in an output current $I_{OA}$ 64' having the same duration $T_A$. in that case, capacitor 40 charges along the ramp 70 to reach a voltage 72 $V_{A/D}$. In contrast, case B, where the $V_{in}$ pulse $T_B$ is substantially shorter, the output current 64", $I_{OB}$, would also have a shorter duration $T_B$. In that case the ramp 70a would be steepened by the increase in gain to achieve the same voltage level 72, $V_{A/D}$ (inversely proportional), by the end of the cycle. If the gain were not increased to increase the slope as shown at 70a and the original gain were used, then the ramp 70 would occur and this would result in the final output voltage $V'_{A/D}$, which would be a much lower voltage and cause a much lower charge to accumulate in capacitor 40. This would cause a mismatch with the dynamic range of the subsequent equipment such as an A/D converter connected to output terminal 24.

Referring again to FIG. 1, a second set of switches 80, 82 may be connected in series with amplifiers 20 and 28 and ground, shunting switches 22 and 30. Switches 80 and 82 are also operated by switch actuator circuit 32 alternately with switches 22 and 30, so that when switches 22 and 30 are on, switches 80 and 82 are off, and vice-versa. This is done so that there will always be present the current flow $I_1$ and $I_2$ in the system. Thus when switches 22 and 30 are turned on the current will be instantly present rather than requiring a buildup time. With switches 22 and 30 off, capacitor 40 can be used to "hold" charge as in an integrate and hold system or be reset for the next cycle.

Figure 4:
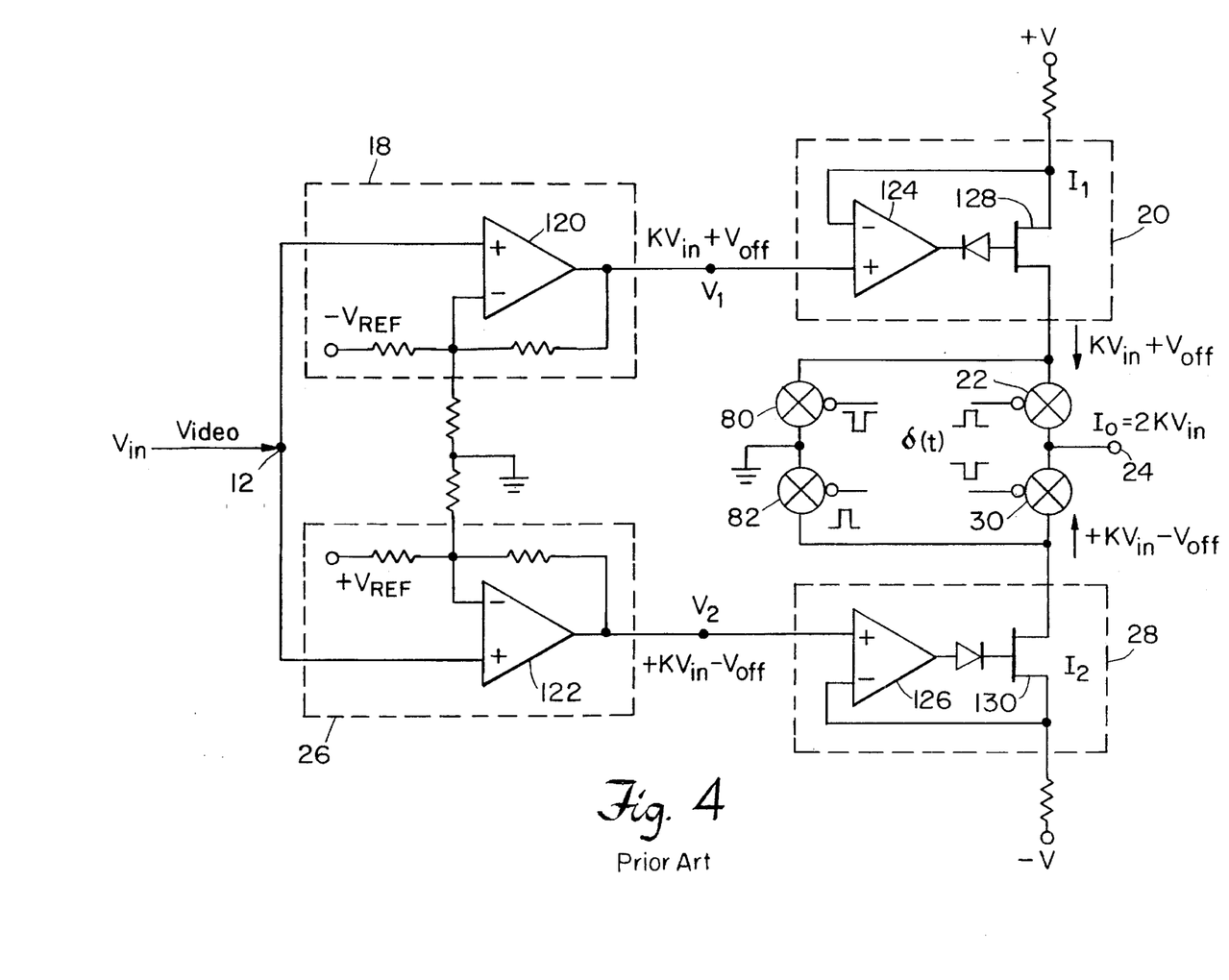
FIG. 4 is a more detailed schematic diagram of the prior art system of FIG. 1 implemented for use in the lower speed range such as 50 nanoseconds.

An embodiment of the prior art device of the '749 patent, useful only at lower speeds in the 50 nanosecond range, is shown in FIG. 4, where operational amplifiers 120 and 122 have been used to implement offset amplifiers 18 and 26, respectively, and operational amplifiers 124 and 126 in conjunction with FETs 128 and 130 have been used to implement voltage to current converter circuits 20 and 28, respectively.

However, as described above both the transistor and operational amplifier implementation of the circuit of the '794 patent suffer from certain drawbacks. The transistor implementation, while capable of operating at high speeds, has poor gain stability. The operational amplifier implementation has increased gain stability, but it is not capable of operating at high speed and requires two stages (two operational amplifiers in each channel) to accomplish voltage to current conversion, voltage gain and offset.

With the advent of high speed, greater than 150 MHz, stable current feedback operational amplifiers the present inventor improved the switching system of the '794 patent by replacing the two low speed operational amplifiers in each channel with a single high speed operational amplifier thereby greatly increasing the gain stability and uniquely accomplishing the functions of voltage to current conversion, voltage gain, and offset in a single stage.

Figure 5:
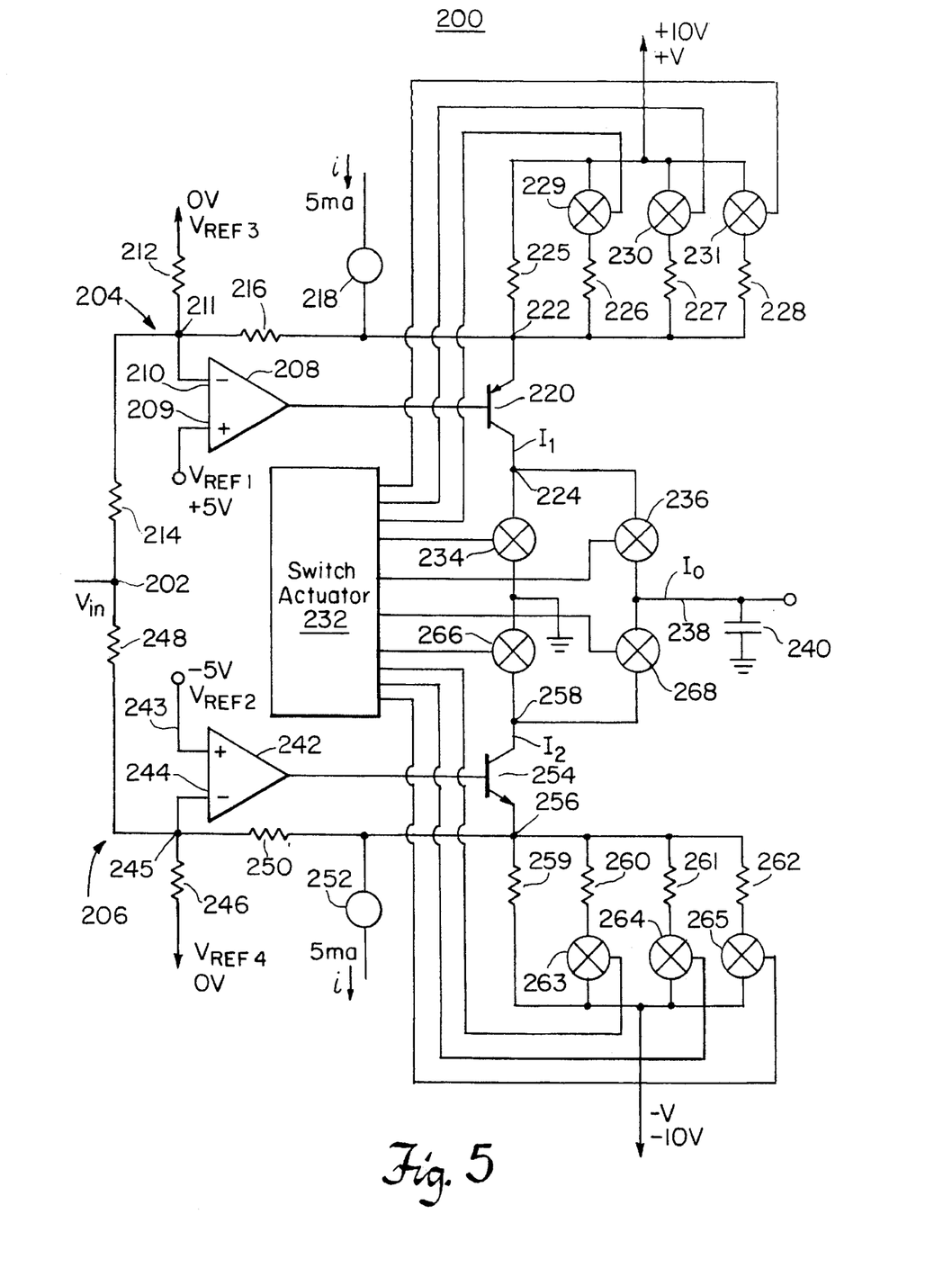
FIG. 5 is a schematic diagram of an improved voltage to current switching system according to this invention.

In FIG. 5 there is shown an improved voltage to current conversion switching system 200 according to this invention which accomplishes voltage to current conversion, voltage gain and offset in a single stage by utilizing a single high speed operational amplifier in each channel which also provides increased gain stability. The waveforms of FIGS. 2 and 3 are also generated by system 200 as this system accomplishes the same functions as the system of the '794 patent, however, with fewer components and increased gain stability over a wide range of operating temperatures.

System 200 includes an input terminal 202 for receiving an input signal voltage such as a video signal $V_{in}$. $V_{in}$ is directed then to two channels, a first or positive channel 204 and a second or negative channel 206. Positive channel 204 includes a high speed operational amplifier 208, capable of operating at frequencies greater than 150 MHz, which includes a reference input 209 supplied by a reference voltage, $V_{REF1}$, typically 5 volts. The other input of operational amplifier 208 is summing input 210 which causes summing junction 211 to be set at a voltage level equal to $V_{REF1}$. Also connected to summing junction 211 is resistor 212 located between summing junction 211 and reference voltage, $V_{REF3}$, which is typically 0 volts. Resistor 212 is typically 5 kilohms. Resistor 214, typically a 2 kilohm resistor, is connected between summing junction 211 and input terminal 202. There is also a resistor 216, typically 1 Kilohm, which is connected between summing junction 211 and current source 218 which supplies a constant current i to junction 222.

The output of operational amplifier 208 is connected to the base of transistor 220 whose emitter is tied to junction 222 and whose collector is tied to junction 224. Between junction 222 and positive voltage terminal V, typically at 10 volts, are resistors 225–228 which are connected in parallel. Resistor 225 has a typical value of 400 ohms and is continuously connected to channel 204, while resistors 226–228 have values of 400 ohms, 200 ohms and 100 ohms, respectively, and are selectively switched into and out of channel 204 by switches 229–231 in order to adjust the level (or gain) of current, $I_1$. Switches 229–231 are under the control of switch actuator 232 which is controlled by control logic or any other suitable timing means which achieves the desired switching cycles. Switch actuator 232 also controls switches 234 and 236 which direct current $I_1$ to ground and output terminal 238, respectively. Output terminal 238 includes capacitor 240 which can be used to "hold" charge as an integrate and hold system or be reset for the next cycle.

Switch actuator 232 selectively switches resistors 226–228 into channel 204 by means of switches 229–231 in order to adjust the amount (or gain) of current, $I_1$, flowing to output terminal 238 while switch 236 is in the on position in order to maintain a constant charge delivery to output 238 regardless of the switching period of switch 236. Switch 234 is connected in parallel with switch 236 and operates as a shunt to ground when switch 236 is switched off. This is done so that there is always present current flow, $I_1$, in the system. Switches 234 and 236 are alternately switched on and off. Thus, when switch 236 is turned on and 234 is turned off there will be current instantly present rather than requiring a build up time.

The second, or negative channel 206 includes complementary, matched components. There is a high speed operational amplifier 242 which includes a reference input 243 supplied by reference voltage, $V_{REF2}$, typically at −5 volts. The other input of operational amplifier 242 is summing input 244 which causes summing junction 245 to be set at a voltage level equal to $V_{REF2}$. Also connected to summing junction 245 is resistor 246 located between summing junction 245 and reference voltage, $V_{REF4}$, which is typically 0 volts. Resistor 246 is typically 5 kilohms. Resistor 248, typically a 2 kilohm resistor, is connected between summing junction 245 and input terminal 202. There is also a resistor 250, typically 1 kilohm, which is connected between summing junction 245 and current source 252 which removes a constant current i from junction 256.

The output of operational amplifier 242 is connected to the base of transistor 254 whose emitter is tied to junction 256 and whose collector is tied to junction 258. Between junction 256 and negative voltage terminal −V, typically at −10 volts, are resistors 259–262 which are connected in parallel. Resistor 259 has a typical value of 400 ohms and is continuously connected to channel 206, while resistors 260–262 have values of 400 ohms, 200 ohms and 100 ohms, respectively, and are selectively switched into and out of channel 206 by switches 263–265 in order to adjust the current, $I_2$. Switches 263–265 are under the control of switch actuator 232. Switch actuator 232 also controls switches 266 and 268 which direct current $I_2$ to ground and output terminal 238, respectively.

Switch actuator 232 selectively switches resistors 260–262 into channel 206 by means of switches 263–265 in the same manner the corresponding resistors in positive channel 204 are switched into that channel. The resistors are selectively switched into channel 206 in order to adjust the amount of current, $I_2$, flowing to output terminal 238 while switch 268 is in the on position and switch 266 is in the off position in order to maintain a constant charge delivery to output 238 regardless of the switching period of switch 268. Switch 266 is connected in parallel with switch 268 and operates as a shunt to ground when switch 268 is switched off. This is also done so that there will always be present current flow $I_2$ in the system.

The operation of switching system 200 may be better understood if specific voltage and current levels are indicated at certain locations throughout the system. The values provided correspond to the typical resistor and reference voltage values delineated above.

As a first example, where $V_{in}$, at input terminal 202 equals 0 volts there will be a 5 volt level at summing junction 211. This voltage level causes a 2.5 milliamp current to flow from summing junction 211 to input terminal 202. Also flowing out of summing junction 211 through resistor 212 is a 1.0 milliamp current. With the 0 volt input and the 5 volt reference level on terminal 209 of operational amplifier 208 an 8.5 volt level is caused to appear at junction 222. This voltage is equal to the reference voltage, $V_{REF1}$ (5 volts), plus the voltage drop across resistor 216, which in this case is equal to 3.5 volts (3.5 milliamps multiplied by 1 kilohm). Thus, with a voltage, V, equal to 10 volts and only 400 ohm resistor 225 connected to channel 204, the current, $I_1$, flowing to output terminal 238 is approximately 5.25 milliamps (i (218)–i (216)+i (225)=5 milliamps–3.5 milliamps+3.75 milliamps). Current source 218 supplies the offset current that would flow from junction 222 through resistor 216, as current source 218 enables the delivery of a constant current through resistor 216, in this case 3.5 milliamps.

For the negative channel, where $V_{in}$ at input terminal 202 equals 0 volts there will be a –5 volt level at summing junction 245. This voltage level causes a 2.5 milliamp current to flow from input terminal 202 to summing junction 245. Also flowing into summing junction 245 through resistor 246 is a 1 milliamp current. Flowing out of summing junction 245 is a 3.5 milliamp current through resistor 250. With the 0 volt input and the –5 volt reference level on terminal 243 of operational amplifier 242 a 8.5 volt level is caused to appear at junction 256. This voltage is equal to the reference voltage, $V_{REF2}$ (–5 volts), plus the voltage drop across resistor 250, which in this case is equal to –3.5 volts (–3.5 milliamps multiplied by 1 kilohm). Thus, with a voltage, V, equal to –10 volts and only 400 ohm resistor 259 connected to negative channel 206, the current, $I_2$, flowing to output terminal 38 is approximately –5.25 milliamps (–i(259)–i (252)+i (250)=–3.75 milliamps–5 milliamps+3.5 milliamps). Current source 252 supplies the offset current that flows to junction 256 through resistor 250, as current source 252 enables the delivery of a constant current through resistor 250, in this case –3.5 milliamps.

Thus, the output current, $I_0$, at terminal 238 is equal to 0 milliamps ($I_0$=–5.25 milliamps+5.25 milliamps) when the input voltage, $V_{in}$, equals 0 volts. Another way of calculating this output current, $I_0$, is to divide the input voltage, $V_{in}$, by the parallel combination of resistor 216 and the resistances 225–228 which are connected to positive channel 204.

As a second example, where the $V_{in}$ at input terminal 202 equals 1 volt there will still be a 5 volt level at summing junction 211. However, because of this new input voltage, a 2 milliamp current is caused to flow from summing junction 211 to input terminal 202. As in the first case flowing out of summing junction 211 through resistor 212 is the same 1.0 milliamp current. However, flowing into summing junction 211 is a 3 milliamp current through resistor 216. With the 1 volt input and the 5 volt reference level on terminal 209 of operational amplifier 208 an 8.0 volt level is caused to appear at junction 222. This voltage is equal to the reference voltage, $V_{REF1}$, plus the voltage drop across resistor 216, which in this case is equal to 3 volts (3 milliamps multiplied by 1 kilohm). Thus, with a voltage V equal to 10 volts and only 400 ohm resistor 225 connected to channel 204, the current, $I_1$, flowing into output terminal 38 is approximately 7.0 milliamps (i (218)–i (216)+i (225)=5 milliamps–3 milliamps+5 milliamps). Current source 218 adds offset current that would flow from junction 222 through resistor 216 as it enables the delivery of a constant 3 milliamp current through resistor 216.

For the negative channel 206, where $V_{in}$ at input terminal 202 equals 1 volt there will be a –5 volt level at summing junction 245. However, because of this new input voltage, a 3 milliamp current is caused to flow from input terminal 202 into summing junction 245. As in the first case flowing into summing junction 245 through resistor 246 is the same 1 milliamp current. However, flowing out of summing junction 245 is a 4 milliamp current through resistor 250. With the 1 volt input and the –5 volt reference level on terminal 243 of operational amplifier 242 a –9 volt level is caused to appear at junction 256. This voltage is equal to the reference voltage, $V_{REF2}$, plus the voltage drop across resistor 250, which in this case equals –4 volts (4 milliamps multiplied by one kilohm). Thus, with a voltage –V equal to –10 volts and only 400 ohm resistor 259 connected to channel 206, the current, $I_2$, is approximately –3.5 milliamps (–i (259)–i (252)+i (250)=–2.5 milliamps–5 milliamps+4 milliamps). Again, current source 252 accounts for any offset current that would flow into junction 256 through resistor 250 as it enables delivery of a constant milliamp current through resistor 250.

Therefore in this case with a 1 volt input level, $V_{in}$, $I_0$ equals $I_1+I_2$ which equals 3.5 milliamps. Similarly, this output current $I_0$ may be calculated by simply dividing the input voltage, $V_{in}$, by the parallel combination of resistor 216 and resistors 225 to 228 connected to positive channel 204.

Although specific features of the invention are shown in some drawings and not others, this is for convenience only as each feature may be combined with any or all of the other features in accordance with the invention. Other embodiments will occur to those skilled in the art and are within the following claims:

What is claimed is:

1. A voltage to current conversion switching system comprising:

an input terminal for receiving an input signal voltage to be converted to a current;

an output terminal;

a positive channel having a first operational amplifier with a reference input and a summing input, said summing input receives said input voltage signal and introduces a first offset voltage to said input signal voltage, a first semiconductor circuit connected to the output of said first operational amplifier to provide a first offset current signal which is dependent on the value of said first offset voltage, and first switching means interconnected with said first semiconductor circuit to deliver said first offset current signal to said output terminal;

a negative channel having a second operational amplifier with a reference input and a summing input, said summing input receives said input voltage signal and introduces a second offset voltage to said input signal voltage, and a second semiconductor circuit connected to the output of said second operational amplifier to provide a second offset current signal which is dependent on the value of said second offset voltage and which is equal in amplitude and opposite in polarity to said first offset current signal to compensate for temperature drift and switching current injection in the first and second offset current signals; and second switching means interconnected with said second semiconductor circuit to deliver said second offset current signal to said output terminal; and means for actuating said first and second switching means simultaneously to open and close and periodically combine said first and second offset current signals to form an output current with temperature drift and switching current injection compensation.

2. The voltage to current conversion switching system of claim 1 further including first and second shunt switching means connected in parallel with said first and second switching means for shunting said first and second offset current signals around said first and second switching means when said first and second switching means are switched off to maintain flow of said first and second offset current signals in said system even when no current is provided to said output terminal.

3. The voltage to current conversion switching system of claim 1 in which each said channel includes gain adjusting means, responsive to said means for actuating, to adjust the gain to maintain a predetermined level of charge provided by said output current.

4. A voltage to charge conversion switching system comprising:

an input terminal for receiving an input signal voltage to be converted to a current;

an output terminal;

a positive channel having a first operational amplifier with a reference input and a summing input, said summing input receives said input voltage signal and introduces a first offset voltage to said input signal voltage, a first semiconductor circuit connected to the output of said first operational amplifier to provide a first offset current signal which is dependent on the value of said first offset voltage, and first switching means interconnected with said first semiconductor circuit to deliver said first offset current signal to said output terminal;

a negative channel having a second operational amplifier with a reference input and a summing input, said summing input receives said input voltage signal and introduces a second offset voltage to said input signal voltage, and a second semiconductor circuit connected to the output of said second operational amplifier to provide a second offset current signal which is dependent on the value of said second offset voltage and which is equal in amplitude and opposite in polarity to said first offset current signal to compensate for temperature drift and switching current injection in the first and second offset current signals, and second switching means interconnected with said second semiconductor circuit to deliver said second offset current signal to said output terminal; and means for actuating said first and second switching means to simultaneously periodically combine said first and second offset current signals to produce an output charge with temperature drift and switching current injection compensation and to maintain the output charge at a predetermined level independent of the timing of the actuation of said switching means.

\* \* \* \* \*